(12) United States Patent
Kaxiras et al.

(10) Patent No.: US 7,573,880 B2
(45) Date of Patent: Aug. 11, 2009

(54) SET-ASSOCIATIVE MEMORY ARCHITECTURE FOR ROUTING TABLES

(75) Inventors: Stefanos Kaxiras, Ioannina (GR); Georgios Keramidas, Patra (GR)

(73) Assignee: Agere Systems Inc., Allentown, PA (US)

( * ) Notice: Subject to any disclaimer, the term of this patent is extended or adjusted under 35 U.S.C. 154(b) by 1005 days.

(21) Appl. No.: 10/983,485

(22) Filed: Nov. 8, 2004

(65) Prior Publication Data

US 2005/0100012 A1 May 12, 2005

Related U.S. Application Data

(60) Provisional application No. 60/519,098, filed on Nov. 12, 2003.

(51) Int. Cl.
*H04L 12/56* (2006.01)
*G06F 13/00* (2006.01)

(52) U.S. Cl. .................................. 370/392; 711/128
(58) Field of Classification Search .................. None
See application file for complete search history.

(56) References Cited

U.S. PATENT DOCUMENTS

| 6,564,211 | B1 * | 5/2003 | Andreev et al. .................. 707/3 |
| 2004/0100960 | A1 * | 5/2004 | Mehta ......................... 370/392 |

OTHER PUBLICATIONS

Huan Liu, "Reducing Routing Table Size Using Ternary-CAM," Hot Interconnects 9, 2001, Aug. 22-24, 2001, pp. 69-73.

A. Agarwal, M. Horowitz, J. Hennessy, "Cache Performance of Operating System and Multiprogramming Workloads," *ACM Transactions on Computer Systems*, Nov. 1988.

A. Agarwal and S. D. Pudar, "Column-Associative Caches: A Technique for Reducing the Miss Rate of Direct-Mapped Caches," *ISCA-20*, May 1993.

Norman P. Jouppi, "Improving Direct-Mapped Cache Performance by the Addition of a Small Fully-Associative Cache and Prefetch Buffers," *ISCA-17*, pp. 364-373, 1990.

B. Lampson, V. Srinivasan, G. Varghese, "OP Lookups using Multiway and Multicolumn Search," Proceedings of *IEEE INFOCOM*, vol. 3, pp. 1248-1256, Apr. 1998.

(Continued)

*Primary Examiner*—Ricky Ngo
*Assistant Examiner*—Clemence Han
(74) *Attorney, Agent, or Firm*—Mendelsohn, Drucker & Associates, PC; Steve Mendelsohn

(57) ABSTRACT

A set-associative architecture (IPStash) restricts routing table prefixes to a limited number of lengths using a controlled, prefix-expansion technique. Since this inflates the routing tables, skewed associativity can be used to increase the effective capacity of IPStash. In addition, pruning of redundant entries can be applied to decrease the size of the expanded tables. Compared to previous proposals, IPStash does not require any complicated routing table transformations but, more importantly, it makes incremental updates to the routing tables effortless. IPStash is also easily expandable. IPStash is both fast and power-efficient compared to TCAMs. Specifically, IPStash devices built in the same technology as TCAMs can run at speeds in excess of 600 MHz, offer more than twice the search throughput (>200 Msps), and consume up to 35 % less power (for the same throughput) than the best commercially available TCAMs when tested with real routing tables and IP traffic.

28 Claims, 7 Drawing Sheets

OTHER PUBLICATIONS

Huan Liu, "Routing Table Compaction In Ternary CAM," *IEEE Micro*, 22(1) 58-64, Jan.-Feb. 2002.

Stefan Nilsson and Gunnar Karlsson, "IP-Address Lookup Using LC-Tries," *IEEE Journal of Selected Areas in Communications*, vol. 17, No. 6, pp. 1083-1092, Jun. 1999.

André Seznec, "A case for two-way skewed-associative caches," Proceedings of the 20th *International Symposium on Computer Architecture*, May 1993.

V. Srinivasan and G. Varghese, "Fast Address Lookups Usings Controlled Prefix Expansion," *ACM Transactions on Computer Systems*, 17(1), pp. 1-40 Feb. 1999.

* cited by examiner

SET-ASSOCIATIVE MEMORY ARCHITECTURE FOR ROUTING TABLES

CROSS-REFERENCE TO RELATED APPLICATIONS

This application claims the benefit of the filing date of U.S. provisional application No. 60/519,098, filed on Nov. 12, 2003.

BACKGROUND OF THE INVENTION

1. Field of the Invention

The present invention relates to memory devices for computers and other signal processing applications, and, in particular, to a memory architecture for routing tables used in packet-based communications, such as IP-routing tables.

2. Description of the Related Art

A critical function in network routers used in packet-based communications networks is packet classification (i.e., determining routing and traffic policies for each incoming packet based on information from the packet itself). A prime example is the Internet Protocol's basic routing function (IP-lookup), which determines the next network hop for each incoming packet. Its complexity stems from wildcards in the routing tables and from the Longest-Prefix Match (LPM) algorithm mandated by the Classless Inter-Domain Routing (CIDR) protocol.

Since the advent of CIDR in 1993, IP routes have been identified by a <route prefix, prefix length> pair, where the prefix length is between 1 and 32 bits. For every incoming packet, a search must be performed in the router's forwarding table to determine the packet's next network hop. The search may be decomposed into two steps. First, the set of routes with prefixes that match the beginning of the incoming packet's IP destination address is found. Then, among this set of routes, the one with the longest prefix is selected. This identifies the next network hop.

What makes IP-lookup an interesting problem is that it must be performed increasingly fast on increasingly large routing tables. Today's leading (2.5, 5, and 10 Gbit/sec) network processors achieve the necessary lookup rate using a combination of high-speed memories and specialized access hardware. Another direction concentrates on partitioning routing tables in optimized data structures, often in tries (a form of trees), so as to reduce as much as possible the average number of accesses needed to perform LPM. Each lookup, however, requires several dependent (serialized) memory accesses, stressing conventional memory architectures to the limit. Memory latency and not bandwidth is the limiting factor with these approaches.

A fruitful approach to circumvent latency restrictions is through parallelism: searching all the routes simultaneously. Content addressable memories (CAMs) perform this fully parallel search. CAM differs from standard memory as follows. In standard memory, an "input address" is specified, and the memory returns the data stored at that address. In CAM, "input data" is specified, and the memory returns the address where that data is stored.

To handle route prefixes (e.g., routes ending with wildcards), ternary CAMs (TCAMs) are used. Ternary CAMs enhance the functionality of standard (binary) CAMs with the addition of a "local mask" for each entry, where the local mask has the same number of bits as the CAM entries. This mask specifies which bits of an entry must coincide with the input data for there to be a match. In particular, TCAMs have an additional "don't care" bit for every tag bit. When the "don't care" bit is set, the tag bit becomes a wildcard and matches anything. The ternary capability of TCAMs makes them an attractive solution for the IP-lookup problem and thus TCAMs have found acceptance in many commercial products.

In a TCAM, IP-lookup is performed by storing routing table entries in order of decreasing prefix lengths. TCAMs automatically report the first entry among all the entries that match the incoming packet destination address (top-most match). The need to maintain a sorted table in a TCAM makes incremental updates a difficult problem. If N is the total number of prefixes to be stored in an M-entry TCAM, naive addition of a new update can result in O(N) moves. Significant effort has been devoted in addressing this problem; however, all the proposed algorithms require an external entity to manage and partition the routing table.

In addition to the update problems, two other major drawbacks hamper the wide deployment of TCAMs: high cost/density ratio and high power consumption. The fully associative nature of the TCAM means that comparisons are performed on the whole memory array, costing a lot of power. A typical 18-Mbit 512K-entry TCAM can consume up to 15 Watts when all the entries are searched. TCAM power consumption is critical in router applications, because it affects two important router characteristics: linecard power and port density. Linecards have fixed power budgets because of cooling and power distribution constraints. Thus, only a few power-hungry TCAMs can typically be implemented per linecard. This, in turn, reduces port density (i.e., the number of input/output ports that can fit in a fixed volume), thereby increasing the running costs for the routers.

Efforts to divide TCAMs into "blocks" and search only the relevant blocks have reduced power consumption considerably. "Blocked" TCAMs are in some ways analogous to set-associative memories. Set associativity means that a given route or prefix maps (is placed) in a relatively small set of possible places in the memory. The route/prefix can occupy any place in this small set without distinction. Full associativity, on the other hand, means that a given route/prefix can occupy any place in memory. In typical blocked TCAMs, the associativity sets are still disadvantageously large. Moreover, in TCAMs, blocking further complicates routing-table management, requiring not only correct sorting but also correct partitioning of the routing tables. Routing-table updates also become more complicated. In addition, external logic to select blocks to be searched is necessary. All these factors correspond to disadvantages of TCAMs in terms of ease-of-use, while still failing to reduce power consumption below that of a straightforward set-associative array.

More seriously, blocked TCAMs can reduce only average power consumption. When the main constraint is the fixed power budget of a linecard, a reduction of average power consumption is of limited value, since maximum power consumption still matters.

SUMMARY OF THE INVENTION

Problems in the prior art are addressed in accordance with the principles of the present invention by a new memory architecture for IP-lookup referred to herein as IPStash. IPStash is based on the hypothesis that IP-lookup needs associativity that depends on routing table size, not necessarily full associativity. This hypothesis is supported by the observed structure of typical routing tables. IPStash is a set-associative memory device that directly replaces a TCAM and offers at the same time:

Better functionality: IPStash behaves as a TCAM, i.e., it stores the routing table and responds with the longest-prefix match to a single external access. In contrast to TCAMs, there is no need for complex sorting and/or partitioning of the routing table. Instead, a simple route-prefix expansion is performed but this can happen automatically and transparently.

Fast routing table updates: Since the routing table needs no special handling, updates are also straightforward to perform. Updates are simply writes to/deletes from IPStash.

Low power: Accessing a set-associative memory is far more power-efficient than accessing a CAM. The difference is achieved by accessing a very small subset of the memory and performing the relevant comparisons, instead of accessing and comparing the whole memory at once.

Higher-density scaling: IPStash can be implemented using SRAM memory cells, which require 4-6 transistors per bit, whereas one bit in a TCAM requires 10-12 transistors. Even when TCAMs are implemented using DRAM technology, they can be less dense than IPStash implemented using SRAMs.

Easy expandability: Expanding the IPStash is as easy as adding more devices in parallel without the need for any complicated arbitration. The net effect is an increase of the associativity of the whole array.

Error-correction codes (ECC): The requirement for ECC is fast becoming a necessity in Internet equipment. Integrating ECC in IPStash (SRAM) is as straightforward as in set-associative caches. On the other hand, as of yet, it is unclear how ECC can be efficiently implemented in TCAMs. In the latter case, all memory must be checked for errors on every access, since it is impossible to tell a no-match from a one-bit error.

In one embodiment, the present invention is a method and an apparatus for storing information for packet routes in a routing table in one or more memory devices, the routing table used for routing packets through a multi-node packet-based network, each packet route comprising an unexpanded prefix and routing data. The packet routes are divided into two or more different classes, at least one of which corresponds to an expanded prefix length. Two or more expanded-prefix packet routes are generated for at least one packet route by expanding the unexpanded prefix of the packet route to the expanded prefix length corresponding to the packet route's class. For each of one or more expanded-prefix packet routes, (1) the expanded prefix is divided into an index and a tag, wherein the routing table has a different row for each different possible index value, and the routing table has a plurality of columns adapted to store information for a corresponding plurality of expanded-prefix packet routes; and (2) information is stored in the routing table for the expanded-prefix packet route, wherein the information comprises the corresponding tag, the length of the corresponding unexpanded prefix, and the corresponding routing data, and the information is stored into a row corresponding to the index value and into an available column.

In another embodiment, the present invention is a method for storing information for packet routes in a routing table in one or more memory devices. The routing table is adapted to be used to route packets through a multi-node packet-based network. Each packet route comprises an unexpanded prefix and routing data. Each unexpanded prefix is less than or equal to N bits long. For each packet route whose unexpanded prefix is M bits long, where M<N, the packet route further comprises (N−M) unused bits. Packet routes are divided into at least first and second sets of packet routes based on their unexpanded prefix lengths. A first set of packet routes corresponds to packet routes having unexpanded prefixes falling within a first range of prefix lengths. The first range of prefix lengths has a minimum prefix length of W bits and a maximum prefix length of X bits. A second set of packet routes corresponds to packet routes having unexpanded prefixes falling within a second range of prefix lengths. The second range of prefix lengths has a minimum prefix length of Y bits and a maximum prefix length of Z bits. For each packet route having an unexpanded prefix falling within the first range of prefix lengths but less than X bits long, the unexpanded prefix is expanded to X bits long by generating a plurality of corresponding expanded-prefix packet routes, each different expanded-prefix packet route comprising the unexpanded prefix, an expanded portion corresponding to a different bit combination, and the routing data. For each packet route having an unexpanded prefix falling within the second range of prefix lengths but less than Z bits long, the unexpanded prefix is expanded to Z bits long by generating a plurality of corresponding expanded-prefix packet routes, each different expanded-prefix packet route comprising the unexpanded prefix, an expanded portion corresponding to a different bit combination, and the routing data. For each expanded-prefix packet route, the bits of the expanded prefix are divided into a multi-bit index and a multi-bit tag. The routing table has a row for each different possible index value. The routing table has a plurality of columns adapted to store information for a corresponding plurality of expanded-prefix packet routes. For each expanded-prefix packet route, the expanded-prefix packet route is stored in the routing table by storing (i) the tag, (ii) the length of the corresponding unexpanded prefix, and (iii) the corresponding routing data into a row corresponding to the index value and into an available column.

In yet another embodiment, the present invention is a routing table for storing information for packet routes in one or more memory devices, the routing table used for routing packets through a multi-node packet-based network, each packet route comprising an unexpanded prefix and routing data. The routing table comprises a row corresponding to each different possible index value associated with expanded-prefix packet routes, wherein an expanded-prefix packet route having an expanded prefix is associated with a packet route having an unexpanded prefix, and each expanded prefix is divided into an index and a tag. The routing table further comprises a plurality of columns adapted to store information for a corresponding plurality of expanded-prefix packet routes, wherein, for each expanded-prefix packet route, the information comprises (i) the tag, (ii) the length of the corresponding unexpanded prefix, and (iii) the corresponding routing data stored into a row of the routing table corresponding to the index value and into an available column of the routing table.

In still another embodiment, the present invention is a memory architecture for a routing table for storing information for packet routes, the routing table used for routing packets through a multi-node packet-based network, each packet route comprising an unexpanded prefix and routing data. The architecture comprises a plurality of memory devices configured in parallel, an input bus adapted to provide the information for storage in the plurality of memory devices, an output bus adapted to receive information read from the plurality of memory devices, and an arbitration bus adapted to select a single set of information, when two or more sets of information are simultaneously read from two or more of the memory devices. Each memory device comprises a row corresponding to each different possible index value associated with expanded-prefix packet routes. An expanded-prefix packet route having an expanded prefix is associated with a packet route having an unexpanded prefix. Each expanded prefix is divided into an index and a tag. Each memory device further comprising a plurality of columns adapted to store information for a corresponding plurality of expanded-prefix packet routes. For each expanded-prefix packet route, the information comprises (i) the tag, (ii) the length of the corresponding unexpanded prefix, and (iii) the corresponding routing data stored into a row of a memory device corresponding to the index value and into an available column of the memory device.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments.

IPStash Architecture

The main idea of the IPStash is to use a set-associative memory structure to store routing tables. IPStash functions and looks like a set-associative cache. However, in contrast to a cache which holds a small part of the data set, IPStash is intended to hold a routing table in its entirety. In other words, it is the main storage for the routing table, not just a cache for it.

Longest-Prefix Matching in IPStash

Figure 1:
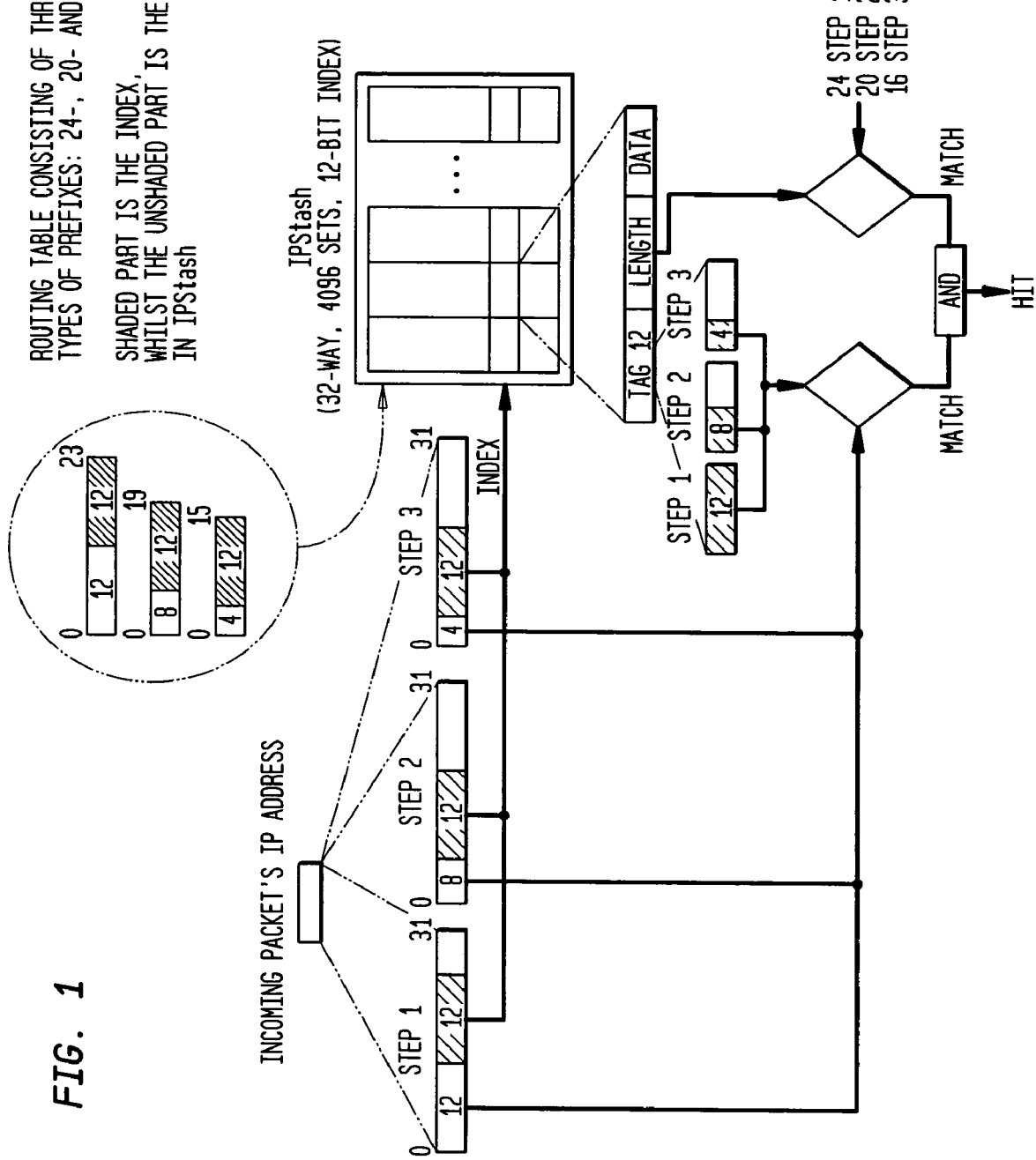
FIG. 1 illustrates IPStash operation for three prefix lengths.

The concept for longest-prefix matching in IPStash is to iteratively search the set-associative array for progressively shorter route prefixes until a match is found. Consider for the moment only a limited set of prefix lengths, for example, 24-bit, 20-bit, and 16-bit prefixes but no other lengths. For a routing table consisting solely of such prefixes and for a 32-way, 4096-set (12-bit index) IPStash, the operation (as shown in FIG. 1) is as follows: Insert the longest, 24-bit prefixes using their rightmost (LSB) 12 bits as index and their leftmost (MSB) 12 bits as tag. The prefix length is also stored with the tag. Similarly, insert the 20-bit prefixes using their rightmost 12 bits as index and leftmost 8 bits as tag, and the 16-bit prefixes using their rightmost 12 bits as index and leftmost 4 bits as tag.

If all of these route prefixes fit in IPStash without any conflicts, then the search for the longest-prefix match to an IP address is accomplished in three steps:

Step 1: Try to match a 24-bit prefix. To index for a 24-bit prefix, use the same index bits used to insert 24-bit prefixes in IPStash. Thus, bits 12:23 of the IP address form the index. Reading the indexed set gives 32 possible results. Among these results, exclusively look for a 24-bit prefix (the length of the prefix is kept with the tag) whose tag matches bits 0:11 of the address. If such a match is found, then the longest-prefix match has been found.

Step 2: Otherwise, use bits 8:19 of the IP address as index, now hoping to find a 20-bit prefix to match. Again, access the appropriate set and search the 32 possible results but now for a 20-bit length match and for an 8-bit tag match.

Step 3: Otherwise, for the last case, try to match a 16-bit prefix using bits 4:15 of the IP address as index and checking for a 4-bit tag.

Because a hit in IPStash requires two conditions to be true (tag match and length match), the final stage of the set-associative structure is more complex than that of a conventional set-associative cache. This is described further in later sections.

Fitting a Real Routing Table in IPStash

The approach described above for three prefix lengths can be extended to more than three prefix lengths, including, in theory, all possible lengths. Although possible, extending the approach to all possible lengths may be impractical. First, it might make some searches unacceptably slow if too many different lengths are tried until a match is found. Second, it might introduce great variability in the hit latency, which is undesirable in a router/network processor environment.

In certain embodiments of the present invention, prefixes of different lengths are expanded to a small set of fixed lengths. The choices of which prefixes to expand and how much to expand them depend largely on the prefix-length distributions of the routing tables.

In general, when the prefix of a table entry having an X-bit prefix is expanded to (X+Y)-bits, $2^Y$ different versions of the table entry are created, corresponding to the $2^Y$ different possible (X+Y)-bit values that start with the same X bits to ensure that all of the different possible permutations of the "don't care" bits are handled. For example, consider a table entry having the 6-bit prefix (100110). Expanding this 6-bit prefix to 8-bits involves the creation of four different versions of the original table entry having the following four 8-bit prefixes: (10011000), (10011001), (10011010), and (10011011), each of which starts with the same six bits corresponding to the original 6-bit prefix.

Figure 2A:
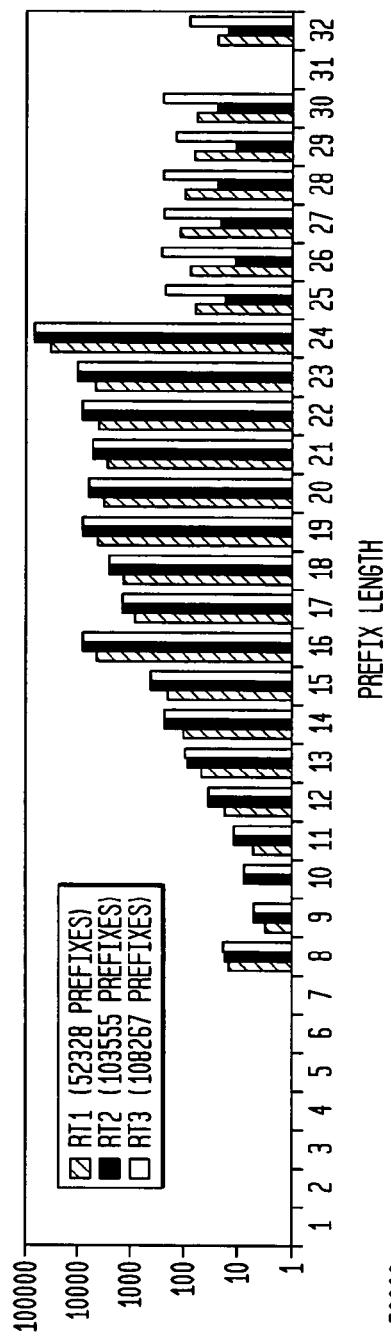
FIGS. 2a-c graphically illustrate distribution of prefix lengths for three different, typical IP-routing tables.
Figure 2B:
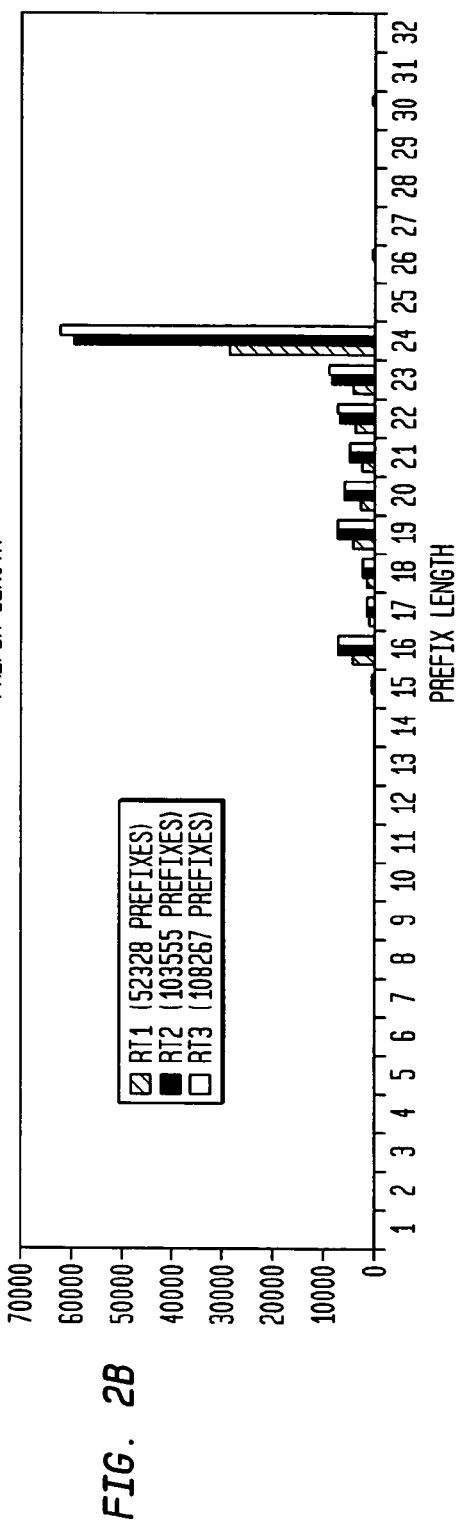

Typically, a distinct commonality in the distribution of prefix lengths in routing tables stems from the allocation of IP addresses in the Internet as a result of CIDR. This distribution is not expected to change significantly with time. FIGS. 2a-b show the distribution of prefix lengths for three different, typical IP-routing tables, where FIG. 2a shows a log-scale graph and FIG. 2b shows a normal-scale graph of the same data. Some general conclusions can be drawn from these IP-routing tables: 24-bit prefixes form about 60% of each table; prefixes longer than 24 bits are very few (about 1%); there are no prefixes less than 8 bits; the bulk of the prefixes have lengths between 16 and 24 bits (inclusive).

Figure 2C:
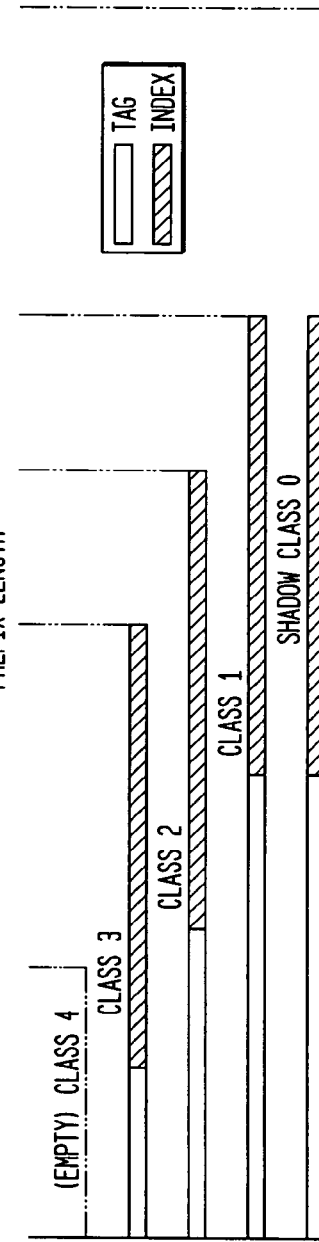

These observations support a categorization of prefixes in an IP-routing table into three major classes and two shadow classes, as indicated in FIG. 2c:

Class 1 contains all the prefixes from 21 to 24 bits, where 21-bit, 22-bit, and 23-bit prefixes are expanded to 24 bits. In particular, the 21-bit prefixes are expanded 8-fold, the 22-bit prefixes 4-fold, and the 23-bit prefixes 2-fold.

Class 2 contains all the prefixes from 17 to 20 bits, where 17-bit, 18-bit, and 19-bit prefixes are expanded to 20 bits. In particular, the 17-bit prefixes are expanded 8-fold, the 18-bit prefixes 4-fold, and the 19-bit prefixes 2-fold.

Class 3 contains all the prefixes from 8 to 16 bits. In this class, the 8-bit prefixes are expanded 256-fold, 9-bit prefixes 128-fold, 10-bit prefixes 64-fold, and so on. The relatively large expansions for certain prefixes (e.g., those having 8, 9, or 10 bits) are acceptable because there are relatively few occurrences of those prefixes.

Class 4, corresponding to prefixes from 1 to 7 bits, is an empty shadow class, since prefixes smaller than 8 bits are typically not found in IP-routing tables, although CIDR does not preclude such possibility. IPStash could handle Class 4 prefixes expanded to 7 bits (up to 128 entries in total).

Shadow Class 0 contains all prefixes greater than 24 bits. This is a special shadow class that is folded on top of Class 1. The same index is used as in Class 1, but the tag is expanded to 20 bits. In particular, the tag contains the 12 tag bits of Class 1 plus any additional prefix bits beyond 24. Class 0 entries are matched with a Class 1 access, but the expanded tag disambiguates among them. The part of the tag that is matched depends on the unexpanded length stored along with the tag. For this class, no prefix expansion is required because its index always precedes the wildcard bits. Typically, Class 0 is exceedingly small compared to the very large Class 1; thus, folding Class 0 entries on top of Class 1 entries has negligible effects.

Prefix expansion results in a more-complex length match to determine a hit. Prefix expansion can result in duplicate expanded prefixes for different routes. For example, consider a first 32-bit IP route having a 6-bit prefix where the first eight bits of the 32-bit first route are (11001011) and the remaining 24 bits are all zeros. Consider further a second 32-bit IP route having a 7-bit prefix where the first eight of the 32-bit second route are (11001010) and the remaining 24 bits are all zeros. There is no conflict between these two original 32-bit routes.

Assume that the route-expansion scheme calls for routes with 6-bit and 7-bit prefixes to be expanded to 8 bits. In that case, the expanded table would have four entries for the first IP route corresponding to 8-bit prefixes (11001000), (11001001), (11001010), and (11001011), while the expanded table would have two entries for the second IP route corresponding to 8-bit prefixes (11001010) and (11001011). Since the two expanded-prefix entries corresponding to the second IP route are identical to two of the expanded-prefix entries corresponding to the first IP route, ambiguity exists.

As indicated in FIG. 1, IPStash addresses this ambiguity by storing the unexpanded prefix length along with each expanded-prefix entry. In particular, within a class, when an ambiguity exists, IPStash selects the entry having the largest unexpanded prefix length.

Prefix expansion can happen externally or internally in IPStash. External prefix expansion involves the cooperation of an entity using the IPStash (e.g., a network processor), so that only prefixes of the correct lengths are stored. Internal expansion is straightforward requiring only a small finite state machine (FSM) and counters to fill the wildcard bits, but it makes prefix insertion in IPStash a variable-time operation as seen from the outside. Either solution is acceptable, but for simplicity the rest of this specification assumes the former.

The effect of expanding routes in three classes is to inflate the routing tables. The effects of this inflation are shown in Table I for the three routing tables RT1, RT2 and RT3 of FIG. 2. The routing tables almost double in size with the route expansion. In general, this means that IPStash capacity should be about twice the size of the routing table to be stored. This, however, is not excessive overhead compared to TCAMs. The true capacity of a TCAM is twice its nominal capacity because of the "don't care" bits (for every storage bit, there is a corresponding "don't care" bit, plus additional comparator hardware). Thus, a 128K-entry IPStash is comparable to a 64K-entry (nominal capacity) TCAM. Moreover, IPStash can be implemented using SRAM arrays, which are about twice as dense as current TCAM technology. Since a 64K-entry TCAM could be used for RT1, a 128K-entry IPStash device can be used for RT1. Similarly, since 128K-entry TCAMs could be used for RT2 and RT3, 256K-entry IPStash devices can be used for RT2 and RT3.

TABLE I

EFFECT OF ROUTE EXPANSION

| | Initial Routes | Expanded Routes | Increase |
| --- | --- | --- | --- |
| RT1 | 52,328 | 102,550 | 1.96 |
| RT2 | 103,555 | 194,541 | 1.88 |
| RT3 | 108,267 | 202,094 | 1.87 |

IPStash stores the three routing tables with considerable but not complete success. Table II shows the IPStash configurations used for each of the routing tables and the resulting conflicts in the set-associative arrays.

TABLE II

UNRESOLVED CONFLICTS

| | Expanded Routes | IPStash Configuration | Unresolved Conflicts |
| --- | --- | --- | --- |
| RT1 | 102,550 | 128K entries (32 assoc) | 1685 (~3.2%) |
| RT2 | 194,541 | 256K entries (64 assoc) | 566 (~0.55%) |
| RT3 | 202,094 | 256K entries (64 assoc) | 979 (~0.9%) |

A conflict occurs when the number of routes that are intended to be placed (mapped) in the same set (i.e., routes having the same IPStash index value) is larger than the number of routes that the set can accommodate. For example, in the case of the RT1 table, the number of the routes in the same set should not exceed 32. Every route beyond 32 should be marked as a conflict. As used here, the term "routes" means the expanded routes, because those are the entities that are going to be placed in the IPStash memory array. As indicated in Table II, conflicts correspond to a relatively small portion of the routing table. One way to accommodate conflicts is to store any affected addresses in cache memory.

Sensitivity Analysis for Classes

The choice of classes is a trade-off between memory requirements of the expanded routing table and the maximum number of accesses required for the associated iterative LPM. Fewer classes means fewer accesses per lookup, but higher memory requirements, and vice-versa. These are opposing trends with respect to both power consumption and lookup latency.

Figure 3:
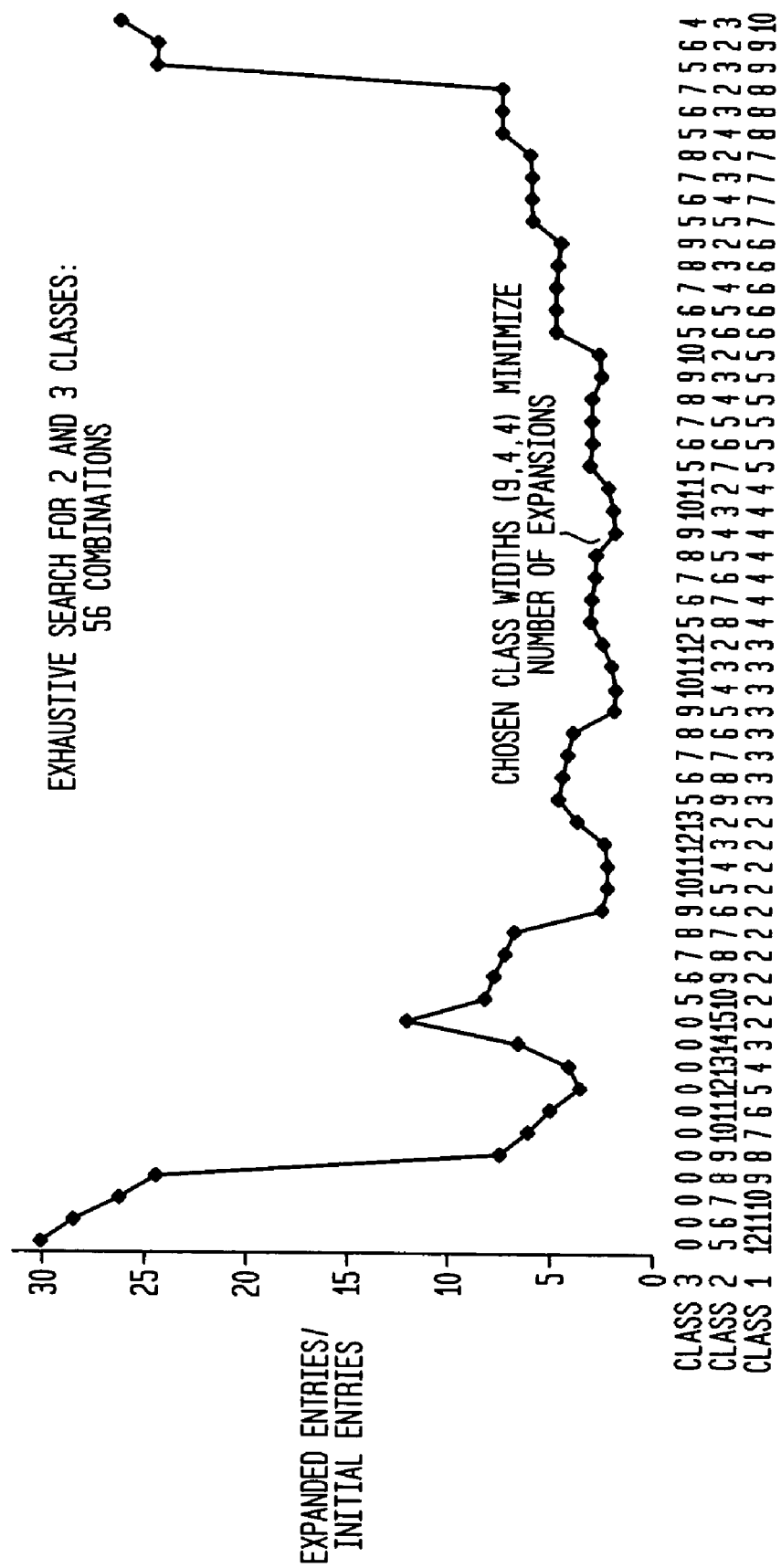
FIG. 3 graphically illustrates results of a sensitivity analysis performed on a routing table for different class schemes.

FIG. 3 graphically shows some of the results of a sensitivity analysis performed on routing table RT3 of FIG. 2, in which the 8-bit to 24-bit prefixes were categorized into different two-class and three-class combinations (where the two shadow Classes 0 and 4 were kept the same as shown in FIG. 2). Note that not all possible class schemes are shown in FIG. 3. The horizontal axis shows the class widths while the vertical axis shows the memory requirements normalized to the size of the original routing table. Thus, each data point identifies the factor by which the size of the original look-up table grows due to expansion of the entries based on the corresponding choice of classes.

For example, the left-most data point presented in FIG. 3 corresponds to a two-class scheme in which Class 1 includes entries having the twelve different prefix lengths from 13 bits to 24 bits, while Class 1 includes entries having the five different prefix lengths from 8 bits to 12 bits. As indicated in FIG. 3, expanding all 8-bit to 11-bit entries to 12 bits and expanding all 13-bit to 23-bit entries to 24 bits results in an over 30-fold increase in the size of the lookup table.

Similarly, the right-most data point present in FIG. 3 corresponds to a three-class scheme in which Class 1 includes entries having the ten different prefix lengths from 15 bits to 24 bits, Class 2 includes entries having the three different prefix lengths from 12 bits to 14 bits, and Class 3 includes entries having the four different prefix lengths from 8 bits to 11 bits. As indicated in FIG. 3, expanding the lookup table based on this class scheme results in an over 25-fold increase in the size of the lookup table.

For this sensitivity analysis, the minimum expansion ratio occurred for the class scheme in which Class 1 includes entries having the four different prefix lengths from 21 bits to 24 bits, Class 2 includes entries having the four different prefix lengths from 17 bits to 20 bits, and Class 3 includes entries having the nine different prefix lengths from 8 bits to 16 bits. This is the class scheme shown in FIG. 2, which has an expansion ratio of less than two (as indicated in Table I).

The results in FIG. 3 indicate that, with only two main classes, almost any choice of class boundaries leads to exorbitant memory requirements. Using four main classes would raise the maximum number of accesses per lookup to four. Because the effect of class boundaries depends on the actual prefix-length distribution, IPStash can be implemented as a configurable device where the classes are set during power-up. For the sake of simplicity, the rest of this specification is restricted to the class scheme shown in FIG. 2.

Increasing Effective Capacity

The following two sections describe how the effective capacity of IPStash devices can be increased.

Skewed Associativity

Barring a change in IPStash geometry (associativity vs. number of sets), a change in the total capacity of an IPStash device, or additional hardware structures, one way to increase effective capacity is based on the idea of a skewed associativity as described in A. Seznec, "A case for two-way skewed-associative cache," *Proceedings of the 20th International Symposium on Computer Architecture*, May 1993, the teachings of which are incorporated herein by reference. Skewed associativity can be applied in IPStash with great success.

A set-associative memory architecture can be represented as a rectangle, where each group of entries in the same horizontal line (i.e., row) is called a set, and each group of entries in the same vertical line (i.e., column) is called a way. In a regular (i.e., non-skewed) set-associative memory architecture for IPStash, the set in which a given route is intended to be placed is defined by taking a specific portion of the route (for example, the 12 lower bits) and using this portion to index (determine) the corresponding set (row). This portion of the route should be the same for all routes placed in the same set. This relationship is called a mapping or hash function. In a regular set-associative memory, the same mapping function is used for all the ways that belong to the same set.

In skewed associativity, the situation is different. Here, different mapping functions (indexes) are used for different ways. The new indexes are created (different for each way) by the logical combination of the same portion of the routes as above with the increasing number of the specific way.

The basic idea of skewed associativity is to use different indexing functions for each of the set-associative ways (e.g., 32 or 64, for the configurations of Table II). Thus, items that, in a standard cache, would compete for a place in the same set because of identical indexing across the ways, in a skewed-associative cache, map on different sets. This typically reduces the overall number of conflicts.

One way to think about skewed associativity is to view it as an increase in the entropy of the system by the introduction of additional randomness in the distribution of the items in the cache. FIG. 4a shows how table RT3 is loaded into an "unlimited-associativity" IPStash (i.e., without restriction to the number of ways). The horizontal dimension represents 4096 different sets and the vertical dimension represents the set-associative ways. As depicted in FIG. 4a, RT3 needs anywhere from 23 to 89 ways. If RT3 was forced into a 64-way IPStash, anything beyond 64 in the graph would be a conflict.

Despite the random look of the graph, the jagged edges do in fact represent order (structure) in the system. It is the order introduced by the hashing function. The effect of skewing (shown in FIG. 4b) is to smooth out the jagged edges of the original graph, which, in some sense, increases the entropy (disorder) of the system.

Figure 4B:
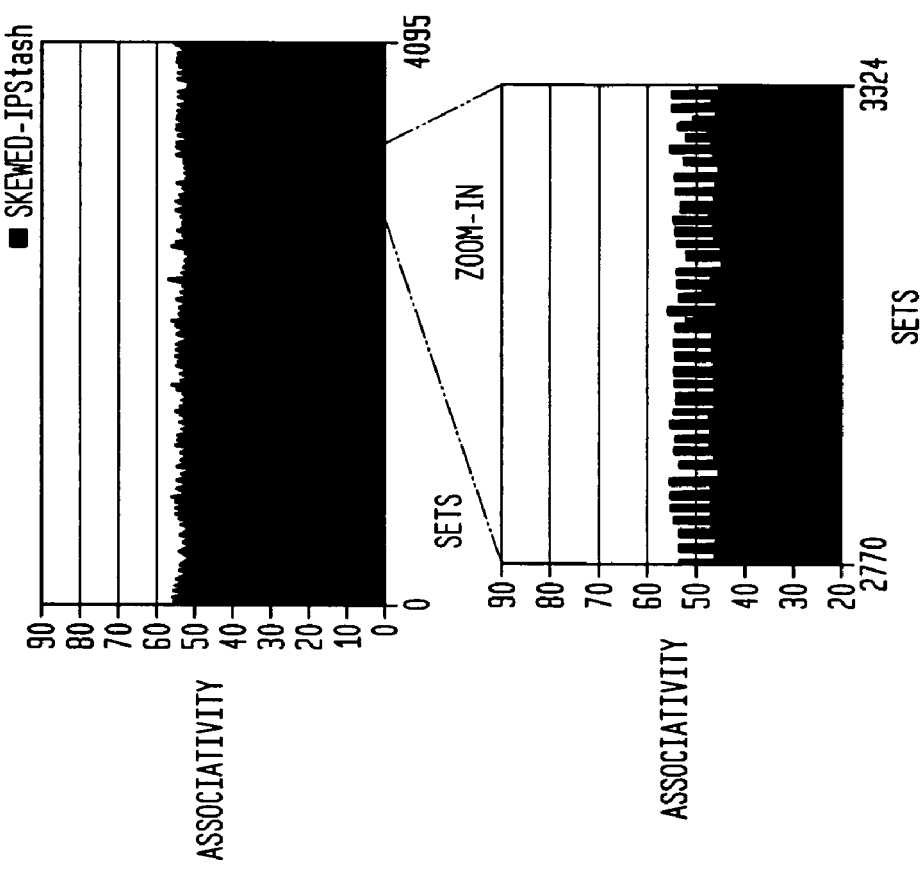
FIGS. 4a-b graphically illustrate the set-associativities of an IPStash before and after being skewed, respectively.
Figure 4A:
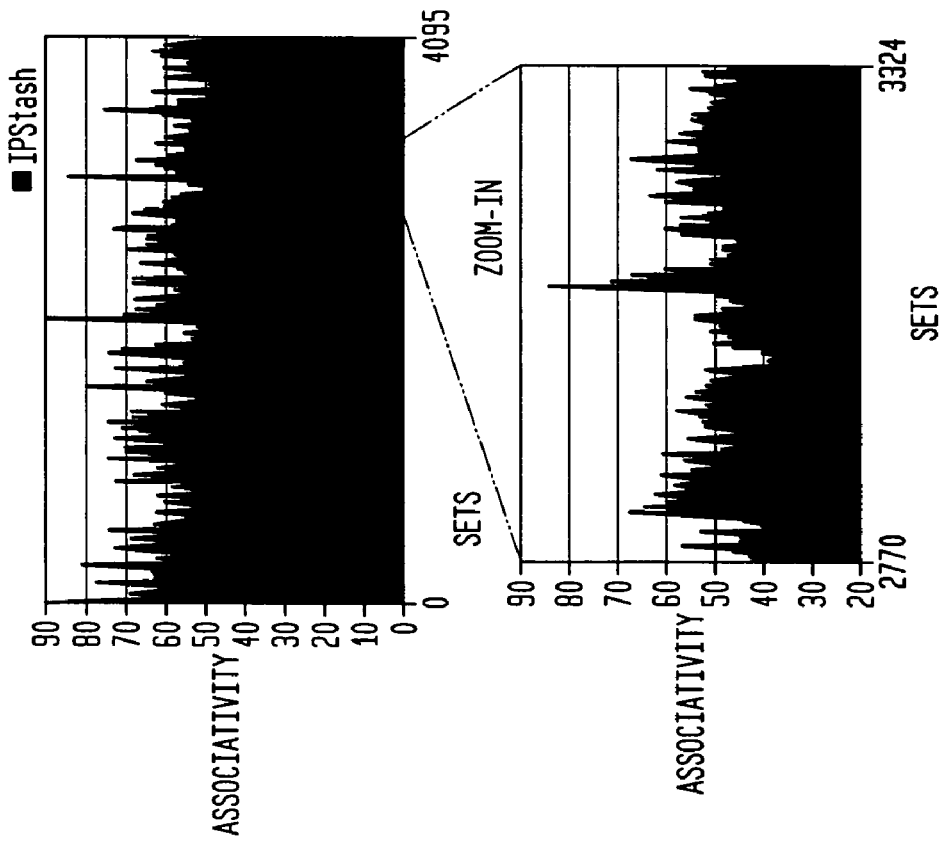

The skewed-associative graph in FIG. 4b was produced using a particular skewing technique. In IPStash, there is not enough freedom to create 32 (or 64) distinct skewing functions because there are only a few significant bits to exploit. One possible compromise solution is to create only eight (four for Class 3) different skewed indices instead of 32 or 64 as the hardware associativity would call for. Each index is used on a bank of four ways in the 32-way IPStash (eight ways in the 64-way IPStash). Although this technique might not yield optimal results, it has the desirable characteristic of curbing the increase in power consumption because of the multiple distinct decoders.

Figure 5:
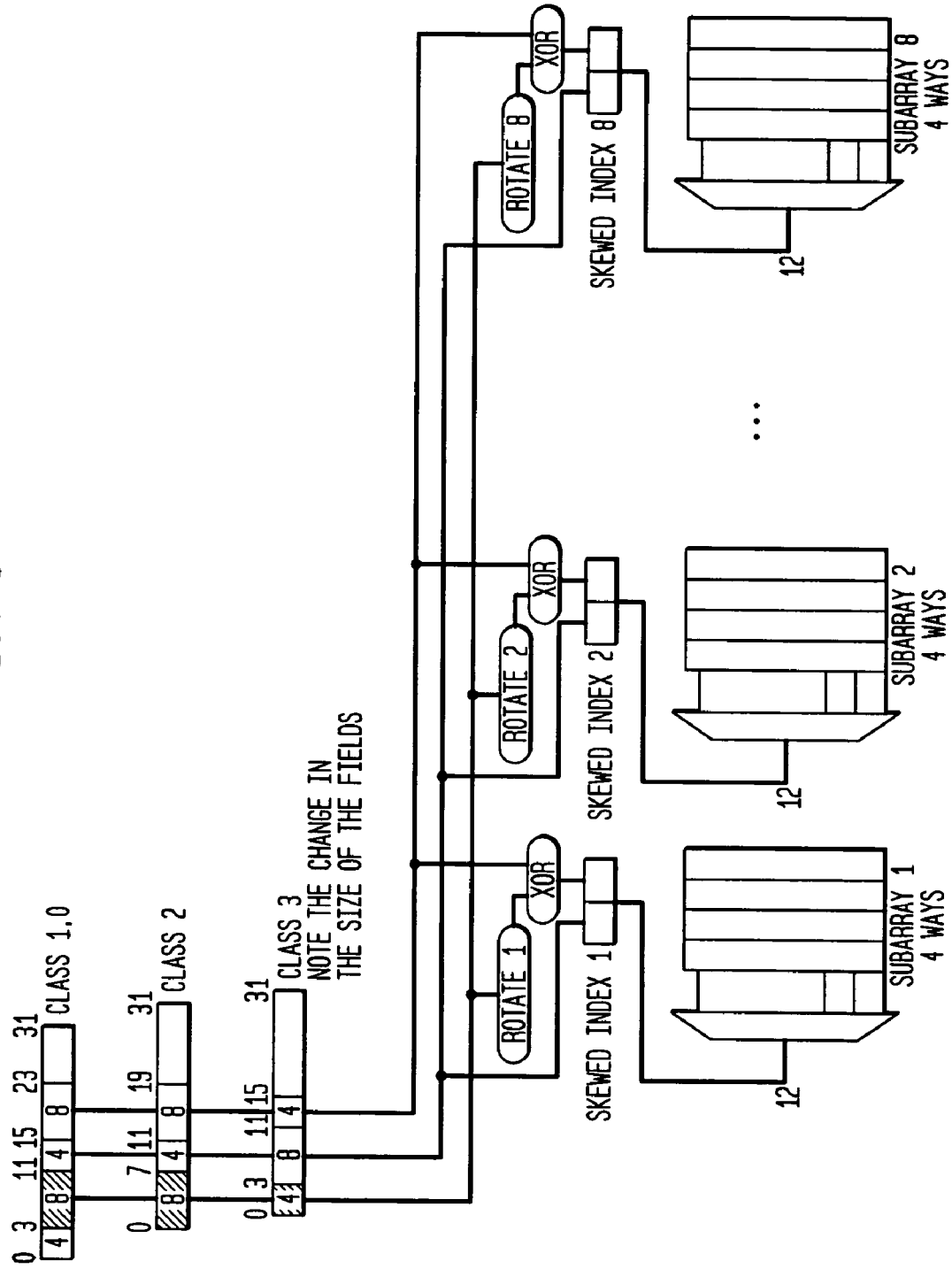
FIG. 5 illustrates how skewed indices can be created.

FIG. 5 shows how skewed indices are created. For each of Classes 0, 1, and 2, the right-most eight bits of the original index are XORed with the eight right-most bits of the tag, right-rotated once for each different skewed index (for a total of 8 times). The left-most four bits of the original index form the beginning of the skewed index. For Class 3, because the tag in this case is only four bits wide, the tag is XORed with the right-most four bits of the original index, right-rotating it once for each skewed index. The left-most eight bits now form the left part (beginning) of the skewed index. Here, the eight rotations result in only four distinct results, each used in two different banks.

Variations of this skewing also work very well or better and other techniques might prove even more successful. For the purposes of this specification, the skewing in FIG. 5 is sufficient to illustrate the general concept. Skewing incurs only a relatively small hardware cost since the mapping functions are chosen for their simplicity.

Table III quantifies the effects of applying skewed associativity to IPStash devices. Without skewed associativity, Table III indicates that a 32-way IPStash would have 1685 conflicts for RT1. Conflicts arise because, as RT1 is loaded into the IPStash, each set is filled differently. Some sets receive only nine entries (i.e., the minimum associativity required by RT1), while some sets receive 49 distinct entries (i.e., the maximum associativity for RT1). The average number of entries is the average associativity. While the average associativities of the standard and skewed-associative IPStashes are the same for each case, the standard deviations ($\sigma$) from the mean are significantly different, and this results in significantly different numbers of conflicts. This is a confirmation of the graphical results shown in FIG. 4. For each of RT1, RT2, and RT3, the maximum associativity for the skewed-associative table does not exceed the predefined associativity (32 or 64) of the corresponding IPStash device.

Associativity and Routing-Table Size

Figure 6:
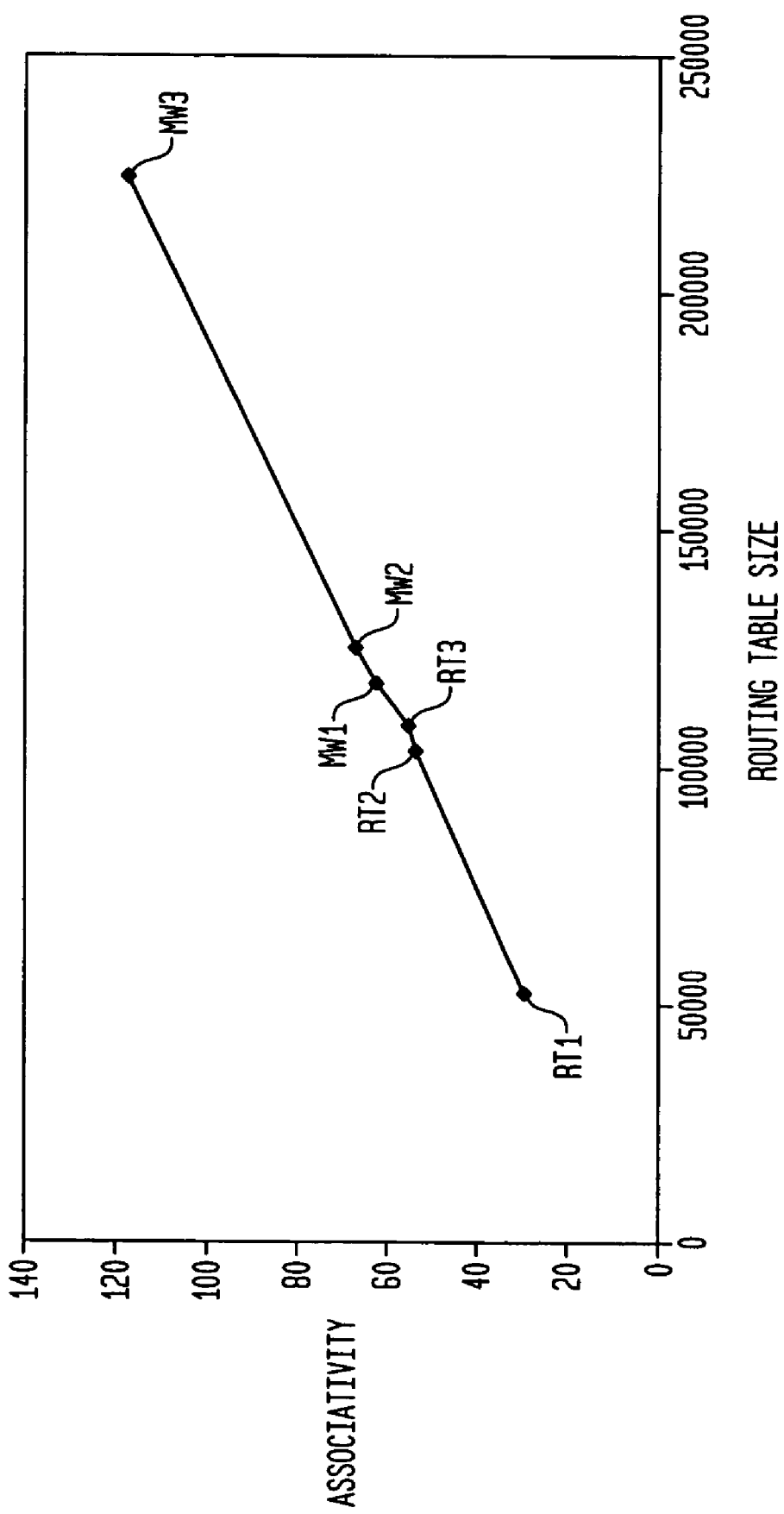
FIG. 6 shows the relationship of the required associativity to the original unexpanded size for different routing tables.

IPStash is based on the hypothesis that IP-lookup needs associativity that depends on routing table size, not necessarily full associativity. Given a skewed-associative IPStash using a 12-bit index (4096 sets), FIG. 6 shows the relationship of the required associativity to the original unexpanded size for the three routing tables RT1, RT2 and RT3 and three other routing tables MW1, MW2 and MW3. This relationship is remarkably linear. It holds for non-skewed associative architectures and for other indices as well, albeit at different slopes. There are two important observations here. First, the slope of the curve is about 0.0005, while the optimal slope is one over the number of sets (1/4096 =0.00024). Considering that expanded tables are about twice their original size, then the slope becomes 2/4096=0.00048. This means that IPStash is nearly optimal with respect to the expanded routing tables. In contrast, the slope for the fully-associative case is 1. Sec-

TABLE III

SKEWED IPSTASH DETAILED COMPARISON

|  | RT1 on 32-Way | | RT2 on 64-Way | | RT3 on 64-Way | |
|---|---|---|---|---|---|---|
| Initial Routes | 52,328 | | 103,555 | | 108,267 | |
| Expanded Routes | 102,550 | | 194,541 | | 202,094 | |
|  | Standard | Skewed | Standard | Skewed | Standard | Skewed |
| Total Conflicts | 1685 | 0 | 566 | 0 | 979 | 0 |
| Min Associativity | 9 | 21 | 22 | 40 | 23 | 42 |
| Max Associativity | 49 | 30 | 86 | 54 | 89 | 56 |
| Average Associativity | 25 | 25 | 47.5 | 47.5 | 49.3 | 49.3 |
| Standard Deviation ($\sigma$) | 11.52 | 1.65 | 15.64 | 2.64 | 16.18 | 2.69 |

Memory Bounds

Skewed associativity successfully reduces conflicts to zero. Results presented in this section provide a rudimentary tool to estimate the capacity of IPStash devices with respect to routing specific tables.

Using standard deviation, the required associativity can be computed for a Confidence Interval (CI) (i.e., the probability that the routing table fits in IPStash). Table IV shows the results for a CI up to a 0.9999. This method is a convenient tool to check IPStash requirements of individual routing tables.

ond, the slope of the curve is substantially constant, which implies that the present invention scales well.

Incremental Updates

A fast update rate is essential for an efficient router design. This is true because the routing tables are not static. Many changes in the routing tables occur due to changes in network topology. In addition, reboots of neighboring routers or Border Gateway Protocol (BGP) misconfigurations do appear to occur every few days in real-life traces. BGP is the protocol that determines the information that the internet devices

TABLE IV

PROBABILISTIC ASSOCIATIVITY REQUIREMENTS

| Standard Deviation Range (around mean) | Confidence Interval (Probability of Falling Inside Range) | Required Associativity | | | | | |
|---|---|---|---|---|---|---|---|
| | | RT1 | | RT2 | | RT3 | |
| | | Standard | Skewed | Standard | Skewed | Standard | Skewed |
| $\sigma$ (±0.5$\sigma$) | 0.6836 | 31 | 26 | 56 | 49 | 58 | 51 |
| 2$\sigma$ (±$\sigma$) | 0.9543 | 37 | 27 | 64 | 51 | 66 | 53 |
| 3$\sigma$ (±1.5$\sigma$) | 0.9973 | 43 | 28 | 71 | 52 | 74 | 54 |
| 4$\sigma$ (±2$\sigma$) | 0.9999 | 49 | 29 | 79 | 53 | 82 | 55 | should share so that efficient, loop-free routes can be established. In a more practical manner, as in the present context, BGP defines the form of the updates of the routing tables. A real-life worst-case scenario that routers are called to handle is the tremendous burst of BGP update packets that results from multiple downed links or routers. In such unstable conditions, the next generation of forwarding engines requires bounded processing overhead for updates in the face of several thousand route updates per second.

Routing-table update has been a serious problem in TCAM-based proposals. The problem is that the more one optimizes the routing table for a TCAM, the more difficult it is to modify it. In some proposals, updating a routing table in a TCAM means inserting/deleting the route externally, re-processing the routing table, and re-loading it on the TCAM. In other proposals, there is provision for empty space distributed in the TCAM to accommodate a number of new routes before the entire table needs to be re-processed and re-loaded. This extra space, however, leads to fragmentation and reduces capacity. The updating problem becomes more difficult in "blocked" TCAMs, where additional partitioning decisions have to be taken.

In contrast, route additions in IPStash are straightforward. A new route is expanded to the prefixes of the appropriate length, which are then inserted into the IPStash in the same way that another prefix is inserted during the initial loading of the routing table.

Deletions are also straightforward. The deleted route is expanded into prefixes of the appropriate class length. The expanded prefixes are then presented to the IPStash to invalidate the matching entries having the same unexpanded length as the deleted route.

Expanding IPStash

As a result of CIDR, routing-table sizes have rapidly increased over the last few years. It is hard to predict routing-table sizes in the future. Thus, scaling is a highly desired feature of systems handling the Internet infrastructure, because they should be able to face new and partly unknown traffic demands.

IPStash can be easily expanded. There is no need for additional hardware, and very little arbitration logic is required, in contrast to TCAMs, which need at least a new priority encoder and additional connections to be added to an existing design. Adding in parallel more IPStash devices increases associativity.

Figure 7:
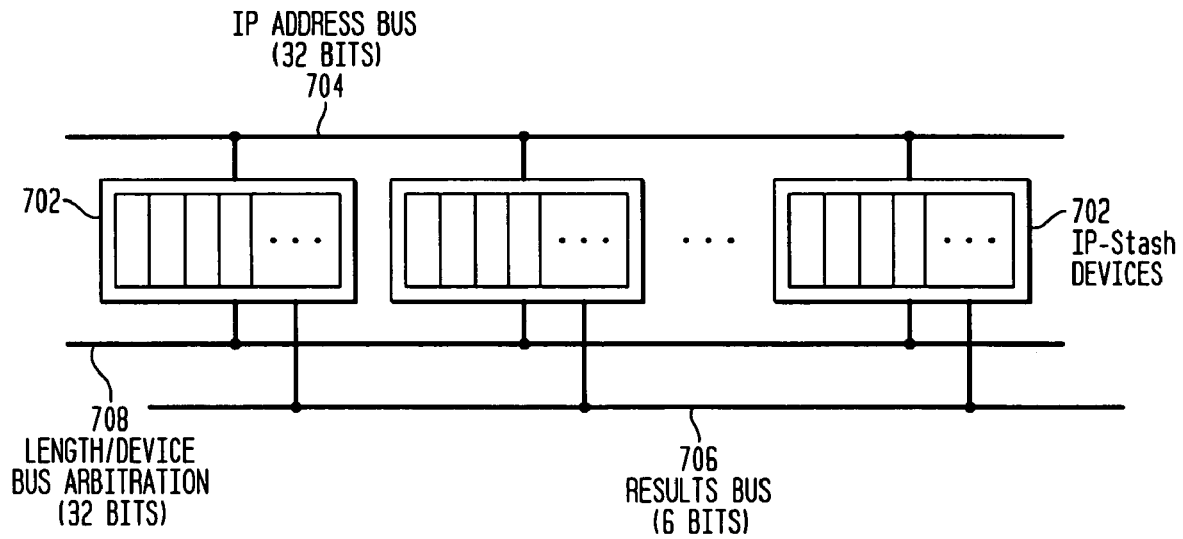
FIG. 7 shows a block diagram of a configuration having an array of multiple IPStash devices connected in parallel between the same (logical) buses.

FIG. 7 shows a block diagram of a configuration having an array of multiple IPStash devices 702 connected in parallel between the same (logical) buses. This configuration, which resembles a cache-coherent bus, can be expanded by adding additional IPStash devices as needed.

Each IPStash device 702 accepts requests (incoming IP addresses plus a command) from request bus 704 and, where there is a hit, replies on result bus 706 with the output port information. When multiple hits occur in different IPStash devices, a 32-bit arbitration bus 708 is used. All three logical buses can be multiplexed on a single physical 40-bit bus (e.g., 32 bits for arbitration, IP addresses, or prefixes, plus 5 bits for prefix lengths, plus 3 bits for commands).

Arbitration works as follows: If a device has a hit before any other device, it is the winner, because it found the longest prefix (further search is inhibited in the rest of the devices). When multiple devices simultaneously have a hit, they output the original unexpanded length of their hit on the arbitration bus by asserting the wire that corresponds to their length. Every device sees each other's length, and a self-proclaimed winner outputs its result on the bus in the next cycle. All other devices whose length is not the largest on the arbitration bus keep quiet. This synchronous scheme works if all the classes are searched in lockstep so that equal access times are guaranteed. Otherwise, a disparity in access times may be handled with additional logic to equalize time differences.

Loading routes on an array of IPStash devices is equally easy. Upon arrival of a new update, the prefix is presented to all IPStash devices in parallel. The devices respond with a hit or miss signal on arbitration bus 708, depending on whether they can accommodate the new prefix without a conflict. The device with the highest statically assigned priority gets to store the prefix. If all the devices experience a conflict, then the IPStash array is considered to be "full."

Route Pruning

Figure 8:
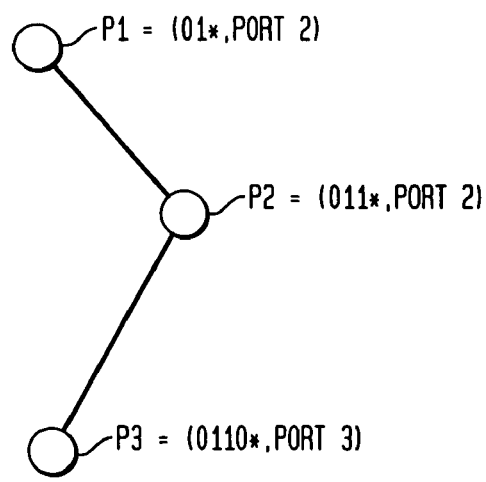
FIG. 8 shows an example of route pruning, where the routing table is organized as a tree structure.

Given a routing table, some structure can be exploited to reduce its size. See H. Liu, "Routing Table Compaction in Ternary CAM," *IEEE Micro,* 22(1):58-64, January-February 2002 ("the Liu reference"), the teachings of which are incorporated herein by reference. Liu used two techniques: (i) mask extension and (ii) pruning, which is relevant to the present invention. An example of pruning is shown in FIG. 8, where the routing table is organized as a tree structure. The parent of prefix P2 is the longest prefix that matches the first few bits of P2. As such, P2 is redundant, because both P1 and P2 yield the same port number and, when P2 is matched, P1 is also matched. Thus, the routing table can be pruned by removing P2 without affecting the routing functionality. Liu reports that typical routing tables can be pruned up to 26.6%.

Techniques similar to pruning can be applied in IPStash, since route expansion itself creates many redundant prefixes. For embodiments of the present invention, Liu's algorithm can be applied off-line by an external agent, since it involves access to the entire routing table. Liu's pruning also affects deletions which should be handled as described in the Liu reference.

Liu's pruning is not required for the successful operation of IPStash, but it does provide size optimization. Since it adds complexity to IPStash, it could be avoided for all but the most cost-sensitive applications where the last bit of effective capacity matters. In addition to or instead of Liu's off-line pruning, internal pruning can be applied on-line as the routing table is inserted in the IPStash. Internal pruning occurs only among routes conflicting in the IPStash and not necessarily on the entire table.

Internal On-Line Pruning Algorithm

Internal on-line pruning is intended to reduce the number of conflicts by allowing long prefixes to replace short prefixes when both are expanded to identical lengths. For example, assume that the prefixes appearing in FIG. 8 belong to the same class whose boundaries are bits 2 to 4. Some of the resulting expanded prefixes (of nodes P1 and P2) have exactly the same tag and index, even though they come from prefixes of different lengths. In this case, only the expanded prefix that preserves the correctness of the routing table is preserved (i.e., the one generated by the longest prefix).

There are (at least) two key differences between Liu's pruning and internal pruning. First, in internal pruning, longer routes are not discarded in favor of smaller ones and, second, in internal pruning, the port number is irrelevant for deciding which expanded route to discard.

Deletions in an Internally Pruned Table

When internal pruning is performed, entries cannot simply be deleted from the routing table, because this might leave holes in the coverage of other shorter prefixes. Deletion in this case becomes a two-step process to patch the holes. The first step is to find out which is the longest prefix in the same class that matches the deleted route. This requires a search for progressively shorter prefixes in the same class that match the deleted prefix. The second step is to modify (instead of deleting) the expanded prefixes of the deleted route to become expanded prefixes of its longest match.

In the face of this tedious operation, internal pruning might not be appropriate for high-performance applications. The trade-off here is between capacity and update speed. For a relatively small decrease in effective capacity, the update speed can be maintained at very high levels. In contrast, in cost-sensitive applications (presumably low-end), one can optimize for capacity and pay a small penalty in update speed.

Pruning Results

Table V shows the effects of both Liu's and internal pruning algorithms, which produce a 10-15% reduction of the expanded routes. This size reduction of the expanded routing table corresponds to a reduction in the required maximum (skewed) associativity.

the victim cache is a small TCAM for longest-prefix matching. A small TCAM does not consume significant power, but it is searched in parallel with the main IPStash on every access.

A second IPStash device can be added in parallel to the first, increasing total associativity. This approach might not be advantageous for only a few conflicts since the incremental step in capacity is quite large. Rather, multiple IPStash devices are used to store significantly larger routing tables as previously described in connection with FIG. 7.

CONCLUSIONS

Certain embodiments of the present invention use a stand-alone set-associative architecture referred to as IPStash. According to these embodiments, routing prefixes are categorized into classes, and a controlled, prefix-expansion technique is used for each category. The expanded prefixes are

TABLE V

PRUNED TABLES

Pruned Routes

| | Expanded Routes | Internal (%) | Liu's (%) | Combined (%) | Max Assoc (% Diff) |
|---|---|---|---|---|---|
| RT1 | 102,500 | 3,153 (3) | 7,545 (7) | 10,037 (10) | 27 (−10) |
| RT2 | 194,541 | 7,957 (4) | 21,513 (11) | 28,539 (15) | 47 (−13) |
| RT3 | 202,094 | 8,352 (4) | 18,992 (9) | 26,168 (13) | 49 (−13) |

Reducing Uncertainty of Effective Capacity

Even with pruning, there is no guarantee that IPStash will accommodate a routing table close to its capacity (when the mean associativity required by the table is much closer than 3σ from the hardware associativity). Many solutions exist to increase the likelihood that a table will fit, including those falling in the following three categories:

Increasing the apparent associativity: Techniques such as hash-rehash (described in A. Agarwal, M. Horowitz, J. Hennesy, "Cache Performance of Operating Systems and Multiprogramming Workloads," *ACM Transactions on Computer Systems*, November 1988, the teachings of which are incorporated herein by reference), column-associativity (described in A. Agarwal and S. D. Pudar, "Column-associative Caches: a Technique for Reducing the Miss Rate of Direct-mapped Caches," *ISCA*-20, May 1993, the teachings of which are incorporated herein by reference), and others have been proposed to make direct-mapped caches appear set-associative. Similar techniques can also be applied in IPStash to resolve conflicts. IPStash already may involve multiple accesses to retrieve an item but such techniques would add further to the latency and power consumption for the few cases that need it.

Victim caches (described in Norman P. Jouppi, "Improving Direct-Mapped Cache Performance by the Addition of a Small Fully-Associative Cache and Prefetch Buffers," *ISCA*-17, pp. 364-373, the teachings of which are incorporated herein by reference) is a classical solution to accommodate conflict-evicted items in direct-mapped caches. In embodiments of the present invention, an analogous "victim cache" can be included and sized to capture the small part of the routing table that is unlikely to fit (as implied by Table IV). For the present invention, placed into the IPStash using a portion of the prefix as index. The rest of the prefix is stored as tag along with its original unexpanded length (so that correct lookup results are guaranteed). The data side of IPStash contains the output port information. IPStash offers simplicity, while being fast and power-efficient at the same time.

The set-associative architecture of IPStash can replace TCAMs in IP-lookup applications. IPStash overcomes many problems faced by TCAM designs, such as the complexity needed to manage the routing table, power consumption, density, and cost. IPStash can be faster and more power efficient than TCAMs, while still maintaining the simplicity of a content addressable memory.

A blocked TCAM, where the TCAM is divided up into independent blocks that can be addressed externally, has a blocked, fully associative architecture. Instead of having a blocked, fully-associative architecture that inherits the deficiencies of the TCAMs, IPStash starts with a clean, set-associative design and implements IP-lookup on it. Associativity is a function of the routing table size and therefore need not be inordinately high, as in blocked TCAMs, with respect to the current storage capacities of such devices.

Longest-prefix matching can be implemented in IPStash by iteratively searching for shorter prefixes. To bound the number of iterations, prefixes are expanded to a set of pre-defined lengths. These fixed lengths stem from the distribution of prefixes in actual routing tables. Skewed associativity can be used to maximize the efficiency of the limited number of associative ways available. In addition, pruning techniques can be used on top of this, but they tend to complicate other IPStash functionality such as deletions.

For current routing table sizes, IPStash can be twice as fast as the top-of-the-line TCAMs, while offering about 35% power savings (for the same throughput) over the announced minimum power consumption of commercial products. In addition, IPStash can exceed 200 Msps, while the state-of-the-art performance for TCAMs (in the same technology) currently only reaches about 100 Msps.

Given the current developments in TCAMs, IPStash is a natural next step for large-scale IP-lookup using associative memories. Furthermore, the principles of IPStash can be extended to many other applications, such as IPv6 and NAT, to handle millions of "flows" (point-to-point Internet connections).

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

We claim:

1. A method for storing information for packet routes in a routing table in one or more memory devices, the routing table used for routing packets through a multi-node packet-based network, each packet route comprising an unexpanded prefix and routing data, the method comprising:
   (a) dividing the packet routes into two or more different classes, at least one of which corresponds to an expanded prefix length;
   (b) generating two or more expanded-prefix packet routes for at least one packet route by expanding the unexpanded prefix of the packet route to the expanded prefix length corresponding to the packet route's class; and
   (c) for each of one or more of the two or more expanded-prefix packet routes:
       (1) dividing the expanded prefix into an index and a tag, wherein:
           the routing table has a different row for each different possible index value; and
           the routing table has a plurality of columns adapted to store information for a corresponding plurality of expanded-prefix packet routes; and
       (2) storing information in the routing table for the expanded-prefix packet route, wherein:
           the information comprises the corresponding tag, the length of the corresponding unexpanded prefix, and the corresponding routing data; and
           the information is stored into a row corresponding to the index value and into an available column.

2. The method of claim 1, wherein the routing data for a specified prefix is retrieved from the routing table by iteratively accessing the routing table to retrieve information using an index value derived by assuming that the specified prefix corresponds to classes having smaller and smaller expanded-prefix lengths.

3. The method of claim 2, wherein the iterative access comprises:
   (i) assuming that the specified prefix corresponds to the class having the largest expanded-prefix length;
   (ii) deriving an index and a tag for the specified prefix based on the assumption of (i);
   (iii) retrieving information from one or more columns in the routing table using the derived index, wherein the retrieved information includes a retrieved tag;
   (iv) for each column, determining whether the retrieved tag matches the derived tag; and
   (v) selecting, when the retrieved tag matches the derived tag for two or more columns, the column corresponding to the longest unexpanded prefix.

4. The method of claim 3, wherein, when no retrieved tag matches the derived tag, the iterative access further comprises:
   (vi) assuming that the specified prefix corresponds to the class having the second largest expanded-prefix length; and
   repeating (ii)-(v) based on the assumption of (vi).

5. The method of claim 4, wherein, when no retrieved tag matches the derived tag, the iterative access further comprises repeating (i)-(v) assuming smaller and smaller expanded-prefix lengths until at least one match is found.

6. The method of claim 1, wherein the packet routes are stored in the routing table using skewed associativity.

7. The method of claim 1, wherein the routing table is pruned to remove redundant entries.

8. The method of claim 1, wherein, when all of the columns corresponding to a row in the one or more memory devices are stored with information, another memory device is configured in parallel with the one or more memory devices to support one or more additional columns of information for the routing table.

9. The method of claim 1, wherein:
   the routing table is stored in a plurality of memory devices configured in parallel;
   the routing data for a specified prefix is retrieved from the routing table by accessing the plurality of memory devices in parallel; and
   when information is successfully retrieved from two or more memory devices for the same specified prefix, the information corresponding to the entry having the longest unexpanded prefix is selected.

10. The method of claim 1, wherein the one or more memory devices are SRAM memory devices.

11. An apparatus for storing information for packet routes in a routing table in one or more memory devices, the routing table used for routing packets through a multi-node packet-based network, each packet route comprising an unexpanded prefix and routing data, the apparatus comprising:
(a) means for dividing the packet routes into two or more different classes, at least one of which corresponds to an expanded prefix length;
(b) means for generating two or more expanded-prefix packet routes for at least one packet route by expanding the unexpanded prefix of the packet route to the expanded prefix length corresponding to the packet route's class; and
(c) means, for each of one or more of the two or more expanded-prefix packet routes, for:
(1) dividing the expanded prefix into an index and a tag, wherein:
the routing table has a different row for each different possible index value; and
the routing table has a plurality of columns adapted to store information for a corresponding plurality of expanded-prefix packet routes; and
(2) storing information in the routing table for the expanded-prefix packet route, wherein:
the information comprises the corresponding tag, the length of the corresponding unexpanded prefix, and the corresponding routing data; and
the information is stored into a row corresponding to the index value and into an available column.

12. A method for storing information for packet routes in a routing table in one or more memory devices, the method comprising:
using the routing table to route packets through a multi-node packet-based network, wherein:
each packet route comprises an unexpanded prefix and routing data;
each unexpanded prefix is less than or equal to N bits long; and
for each packet route whose unexpanded prefix is M bits long, where M<N, the packet route further comprises (N–M) unused bits;
dividing packet routes into at least first and second sets of packet routes based on their unexpanded prefix lengths, wherein:
a first set of packet routes corresponds to packet routes having unexpanded prefixes falling within a first range of prefix lengths;
the first range of prefix lengths has a minimum prefix length of W bits and a maximum prefix length of X bits;
a second set of packet routes corresponds to packet routes having unexpanded prefixes falling within a second range of prefix lengths; and
the second range of prefix lengths has a minimum prefix length of Y bits and a maximum prefix length of Z bits;
expanding, for each packet route having an unexpanded prefix falling within the first range of prefix lengths but less than X bits long, the unexpanded prefix to X bits long by generating a plurality of corresponding expanded-prefix packet routes, each different expanded-prefix packet route comprising the unexpanded prefix, an expanded portion corresponding to a different bit combination, and the routing data;
expanding, for each packet route having an unexpanded prefix falling within the second range of prefix lengths but less than Z bits long, the unexpanded prefix to Z bits long by generating a plurality of corresponding expanded-prefix packet routes, each different expanded-prefix packet route comprising the unexpanded prefix, an expanded portion corresponding to a different bit combination, and the routing data;
dividing, for each expanded-prefix packet route, the bits of the expanded prefix into a multi-bit index and a multi-bit tag, wherein:
the routing table has a row for each different possible index value; and
the routing table has a plurality of columns adapted to store information for a corresponding plurality of expanded-prefix packet routes; and
storing, for each expanded-prefix packet route, the expanded-prefix packet route in the routing table by storing (i) the tag, (ii) the length of the corresponding unexpanded prefix, and (iii) the corresponding routing data into a row corresponding to the index value and into an available column.

13. An apparatus for storing information for packet routes in a routing table in one or more memory devices, the routing table used for routing packets through a multi-node packet-based network, each packet route comprising an unexpanded prefix and routing data, the routing table comprising:
a row corresponding to each different possible index value associated with expanded-prefix packet routes, wherein:
an expanded-prefix packet route having an expanded prefix is associated with a packet route having an unexpanded prefix; and
each expanded prefix is divided into an index and a tag; and
a plurality of columns adapted to store information for a corresponding plurality of expanded-prefix packet routes, wherein:
for each expanded-prefix packet route, the information comprises (i) the tag, (ii) the length of the corresponding unexpanded prefix, and (iii) the corresponding routing data stored into a row of the routing table corresponding to the index value and into an available column of the routing table.

14. The apparatus of claim 13, wherein:
the packet routes are divided into two or more different classes, at least one of which corresponds to an expanded prefix length; and
two or more expanded-prefix packet routes are generated for at least one packet route by expanding the unexpanded prefix of the packet route to the expanded prefix length corresponding to the packet route's class.

15. The apparatus of claim 13, wherein the routing data for a specified prefix is retrieved from the routing table by iteratively accessing the routing table to retrieve information using an index value derived by assuming that the specified prefix corresponds to classes having smaller and smaller expanded-prefix lengths.

16. The apparatus of claim 13, wherein the packet routes are stored in the routing table using skewed associativity.

17. The apparatus of claim 13, wherein the routing table is pruned to remove redundant entries.

18. The apparatus of claim 13, wherein, when all of the columns corresponding to a row in the one or more memory devices are stored with information, another memory device is configured in parallel with the one or more memory devices to support one or more additional columns of information for the routing table.

19. The apparatus of claim 13, wherein:
the routing table is stored in a plurality of memory devices configured in parallel;

the routing data for a specified prefix is retrieved from the routing table by accessing the plurality of memory devices in parallel; and when information is successfully retrieved from two or more memory devices for the same specified prefix, the information corresponding to the entry having the longest unexpanded prefix is selected.

20. The apparatus of claim 13, wherein the one or more memory devices are SRAM memory devices.

21. A memory architecture for a routing table for storing information for packet routes, the routing table used for routing packets through a multi-node packet-based network, each packet route comprising an unexpanded prefix and routing data, the architecture comprising:

a plurality of memory devices configured in parallel;

an input bus adapted to provide the information for storage in the plurality of memory devices;

an output bus adapted to receive information read from the plurality of memory devices; and an arbitration bus adapted to select a single set of information, when two or more sets of information are simultaneously read from two or more of the memory devices, wherein:

each memory device comprises a row corresponding to each different possible index value associated with expanded-prefix packet routes;

an expanded-prefix packet route having an expanded prefix is associated with a packet route having an unexpanded prefix;

each expanded prefix is divided into an index and a tag;

each memory device further comprising a plurality of columns adapted to store information for a corresponding plurality of expanded-prefix packet routes; and for each expanded-prefix packet route, the information comprises (i) the tag, (ii) the length of the corresponding unexpanded prefix, and (iii) the corresponding routing data stored into a row of a memory device corresponding to the index value and into an available column of the memory device.

22. The memory architecture of claim 21, wherein:

the packet routes are divided into two or more different classes, at least one of which corresponds to an expanded prefix length; and two or more expanded-prefix packet routes are generated for at least one packet route by expanding the unexpanded prefix of the packet route to the expanded prefix length corresponding to the packet route's class.

23. The memory architecture of claim 21, wherein the routing data for a specified prefix is retrieved from the routing table by iteratively accessing the routing table to retrieve information using an index value derived by assuming that the specified prefix corresponds to classes having smaller and smaller expanded-prefix lengths.

24. The memory architecture of claim 21, wherein the packet routes are stored in the routing table using skewed associativity.

25. The memory architecture of claim 21, wherein the routing table is pruned to remove redundant entries.

26. The memory architecture of claim 21, wherein, when all of the columns corresponding to a row in the plurality of memory devices are stored with information, another memory device can be configured in parallel with the plurality of memory devices to support one or more additional columns of information for the routing table.

27. The memory architecture of claim 21, wherein:

the routing data for a specified prefix is retrieved from the routing table by accessing the plurality of memory devices in parallel; and when information is successfully retrieved from two or more memory devices for the same specified prefix, the arbitration bus selects information corresponding to the entry having the longest unexpanded prefix.

28. The memory architecture of claim 21, wherein the plurality of memory devices are SRAM memory devices.

* * * * *